United States Patent

Lawson

4,072,651

Feb. 7, 1978

[54] TETRAMETAPHOSPHIMIC ACID AND DERIVATIVES AS FLAME RETARDANTS

[75] Inventor: David Francis Lawson, Akron, Ohio

[73] Assignee: The Firestone Tire & Rubber Company, Akron, Ohio

[21] Appl. No.: 290,588

[22] Filed: Sept. 20, 1972

[51] Int. Cl.$^2$ .......................... C08K 9/00; C08K 5/16; C08L 7/00

[52] U.S. Cl. .......................... 260/42.44; 106/15 FP; 260/42.34; 260/42.37; 260/45.9 NP; 423/302

[58] Field of Search .................... 423/302; 106/15 FP; 260/41.5 A, 45.9 R, 45.9 NP, 42.34, 42.37, 42.44

[56] References Cited

U.S. PATENT DOCUMENTS

| 2,637,704 | | Hurley | 106/15 FP |
|---|---|---|---|
| 2,681,295 | /1954 | Hamalainen | 117/137 |
| 2,909,445 | /1959 | Redfarn et al. | 106/15 FP |
| 3,018,167 | 1/1962 | Nielsen | 423/302 |
| 3,379,510 | 4/1968 | Jaszka | 423/302 |
| 3,678,135 | 7/1972 | Mastromatteo et al. | 260/41.5 A |

FOREIGN PATENT DOCUMENTS

| 1,081,245 | 1954 | France. |
|---|---|---|
| 1,157,097 | 1958 | France. |
| 774,694 | 1957 | United Kingdom. |
| 788,785 | 1958 | United Kingdom. |

OTHER PUBLICATIONS

Lyons, "The Chem. & Uses of Fire Retardants", pp. 99, 101, 102, 330, 331 (Wiley-Interscience 1970).
Lyons, "The Chem. & Uses of Fire Retardants", pp. 37, 40, 100, 182, 361 (Wiley-Interscience 1970).
Chem. Rev., vol. 62, 247–281 (1962).
Hamalainen et al., in Tex. Res. J. 26, 141–149 (1956).
Chem. Abs. 47,8292 (1953); 48,12419 (1954); 52,9624 (1958); 53,8708 (1959); 54,2780 (1960).

*Primary Examiner*—Thomas De Benedictis, Sr.

[57] ABSTRACT

Tetrametaphosphimic acid [HNPO(OH)]$_4$.XH$_2$O and its salts are useful as flame retardants, for synthetic resins and natural materials.

9 Claims, No Drawings

TETRAMETAPHOSPHIMIC ACID AND DERIVATIVES AS FLAME RETARDANTS

This invention relates to the use of tetrametaphosphimic acid and its salts as flame retardants. More particularly it relates to the use of such compounds with both synthetic resins and natural materials to impart reduced flammability and increased fire resistance thereto.

Many substances which contain the elements P and N and which can decompose to products which include inorganic acid products have been found useful as flame retardants or fire retardants. Such known fire retardants include phosphazene polymers and their derivatives, e.g. as described in U.S. Pat. Nos. 2,909,446 and 3,641,193 for example; polyphosphates; and trimetaphosphimic acid and its salts, e.g. as described in U.S. Pat. Nos. 3,018,167 and 3,185,733.

It is readily recognized that any substance utilized for this purpose must not interfere with the processability or the usefulness of the end product. Many of the known prior art materials exhibit sufficient solubility in water as to be washed out by ordinary laundering. Other known compounds impart a stiffness and are therefore objectionable since they impair the feel or handle of the textile material. Still other materials interfere with the processing of the fiber or textile (dyeing, etc.). Trimetaphosphimic acid and its salts which have been suggested as fire retardants are much less stable in humid environments than tetrametaphosphimic acid and its salts and tend to degrade when exposed to humid atmospheres for long intervals of time.

A principal object of this invention is to provide improved flame retardance to synthetic polymers and natural materials so that flammability and fire losses can be reduced.

Another object of this invention is to provide flame retardants which are not adversely affected by exposure to relatively high humidities and which have low water solubility and do not leach out of articles treated with such materials, e.g. in laundering.

Still another object of the invention is to provide compositions from which thermoset synthetic resin articles having reduced flammability are readily produced.

Still another object of the invention is to provide a flame retardant which acts synergistically with other known flame retardant materials, to produce articles with improved burn resistance.

These and other objects of the invention will be pointed out or will become apparent in the description which follows.

Briefly the invention comprises the use of tetrametaphosphimic acid and its salts as flame retardants.

Tetrametaphosphimic acid is usually considered to have the formula $[HNPO(OH)]_4 \cdot XH_2O$ wherein X is any small integer. As indicated by the formula tetrametaphosphimic acid and salts contain high percentages of phosphorus and nitrogen and contain water which may be liberated on heating, adding to their efficiency as flame retardants and are relatively stable.

Furthermore, tetrametaphosphimic acid and its derivatives can form molten glasses within a treated article upon strong heating as in burning, thus promoting and strengthening char, the combined effect of which is insulation and surface protection of the treated article. The formation of mineral acids is beneficial to dehydration reactions; hence, tetrametaphosphimic acid and its derivatives are useful promoters for intumescent coating formulations when combined with conventional hydrated spumifiers and char-forming ingredients. Tetrametaphosphimic acid and its diammonium salt exhibit low water solubility.

Tetrametaphosphimic acid is readily prepared from phosphazene polymerization by-products as starting material, and is among the most economical phosphazene derivatives, requiring a simple hydrolysis reaction for its preparation.

Tetrametaphosphimic acid is prepared from octachlorocyclotetraphosphazene by stirring an ether solution of the phosphazene in the presence of an equal volume of water or aqueous potassium acetate, e.g. as described by Stokes in the American Chemical Journal 18, 780 (1896). To prepare tetraammonium tetrametaphosphimate $(NH_4^+O^-PONH)_4 \cdot 4H_2O$— the solid acid is suspended in water and treated with an excess of ammonium hydroxide. The solution is heated for about ½ hr., then cooled and the solid salt is filtered out. The diammonium salt of tetrametaphosphimic acid can be prepared from the tetraammonium salt by acidification of a neutral solution or suspension with acetic acid. The variously prepared derivatives were tested for flame retardancy in silica-filled polybutadiene thermoset formulations.

Compositions were prepared and tested as follows. One hundred (100) parts by weight (dry) of low to medium molecular weight high vinyl (>90%) butadiene rubber resin was mixed in a bowl type mixer with a suitable solvent such as hexane, and with 380 parts by weight of silica (minue 325 mesh), 3 parts by weight of a mold lubricant and release agent such as calcium stearate, 3 parts by weight of dicumyl peroxide or equivalent curing agent and 3 parts by weight of a commercial coupling agent. After thorough mixing the tetrametaphosphimic acid (or its salt) was added and mixed into the batch. The mixture was then poured into a dish or tray, heated mildly to evaporate the hexane or other solvent, and was then molded to the desired shape, and cured at 350° F in the mold, under pressure. Except for the tetrametaphosphimic acid, the formulation and molding are conventional.

The product was cut into test strips 6 × ½ × 1/10" and tested for self extinguishment in accordance with ASTM-D 635-68 with the following results:

| | Horizontal Burn Test Burn Rate (in/min.) |
|---|---|
| 1. Control (No. Fr.R.) | 0.12 |
| 2. Tetrametaphosphimic Acid (TMPA) (15 phr)* | 0.03 |
| 3. Tetraammonium Salt of TMPA (15 phr) | 0.02 |
| Tetraammonium Salt of TMPA (10 phr) | 0.00 |

*phr means parts per 100 parts of rubber

Similarly prepared samples were cut to 6 × ¼ × ¼ inches and tested according to ASTM-D2863- 70 Limiting Oxygen Index (LOI) Test, in which higher numbers indicate greater burn difficulty, i.e. less flammability. The results were as follows:

| Results of ASTM-D2863-70 | Limiting Oxygen Index (LOI) Test (higher number indicates greater burn difficulty) |
|---|---|
| 1. Control (no F.R.) | 24.0 – 24.5 |
| 2. Tetrabromobenzene 15 phr | 28.5 – 29.0 |
| 3. Tetraammonium Salt 10 phr (TMPA) | 26.5 – 27.0 |
| 4. TMPA Diammonium Salt 10 phr | 25.0 – 25.5 |
| 5. Tetrabromobenzene 15 phr + TMPA Tetraammonium Salt 4 phr | 30.0 – 30.5 |

The synergetic properties of tetraammonium tetrametaphosphimate in combination with other known flame retardants are demonstrated by these results.

Similar reduced flammability is found with the synthetics including polyurethanes, polyesters, polyvinyl and polyvinylidene resins, and with natural materials such as cotton, wool, wood and other cellulosics, when treated with between 12 and 25 parts of tetrametaphosphimic acid (TMPA) or its salts per 100 parts of resin or natural product. Hence it is not intended that the invention be limited except as required by the appended claims.

I claim:

1. A process for preparing a burn-resistant composition which comprises admixing between 0.2 and 20 parts by weight of tetrametaphosphimic acid or its salts with each 100 parts by weight of a burnable synthetic resin or natural material, the burn resistance of which is to be improved.

2. The process of claim 1 wherein the material is a synthetic resin.

3. The process of claim 2 including in addition, molding the resin into an article.

4. Silica filled polybutadiene articles rendered burn resistant by the incorporation therein of tetrametaphosphimic acid or its salts.

5. The process of claim 2 wherein the proportion of tetrametaphosphimic acid or its salts are between about 4 and 20 parts by weight for each 100 parts of resin, by weight.

6. The process of claim 2 wherein the resin contains between 5 and 25 parts of a halogen-containing additive.

7. The process of claim 6 wherein the halogen-containing additive is tetrabomobenzene.

8. A burn-resistant article comprising between 0.2 to 20 parts by weight of tetrametaphosphimic acid or its salts and 100 parts by weight of a burnable synthetic resin or natural material.

9. The process of claim 1 wherein the salts are selected from the group consisting of diammonium and tetraammonium salts of tetrametaphosphimic acid.

* * * * *